US006934810B1

(12) United States Patent
Williams et al.

(10) Patent No.: US 6,934,810 B1
(45) Date of Patent: Aug. 23, 2005

(54) DELAYED LEAKY WRITE SYSTEM AND METHOD FOR A CACHE MEMORY

(75) Inventors: James A. Williams, Mahtomedi, MN (US); Robert H. Andrighetti, Somerset, WI (US); Kelvin S. Vartti, Hugo, MN (US); David P. Williams, Mounds View, MN (US)

(73) Assignee: Unisys Corporation, Blue Bell, PA (US)

( * ) Notice: Subject to any disclaimer, the term of this patent is extended or adjusted under 35 U.S.C. 154(b) by 375 days.

(21) Appl. No.: 10/255,276

(22) Filed: Sep. 26, 2002

(51) Int. Cl.[7] .............................................. G06F 12/00
(52) U.S. Cl. ........................ 711/137; 711/133; 711/135
(58) Field of Search ................................ 711/133, 135, 711/137, 141–147; 712/205–207

(56) References Cited

U.S. PATENT DOCUMENTS 5,845,325 A * 12/1998 Loo et al. .................... 711/135
6,088,773 A *  7/2000 Kano et al. .................. 711/161
6,230,241 B1 *  5/2001 McKenney ................. 711/118
6,381,674 B2 *  4/2002 DeKoning et al. .......... 711/113
6,493,801 B2 * 12/2002 Steely et al. ................ 711/135
6,601,153 B1 *  7/2003 Engelbrecht et al. ....... 711/166
6,631,447 B1 * 10/2003 Morioka et al. ............ 711/141
6,681,297 B2 *  1/2004 Chauvel et al. ............. 711/130

* cited by examiner

*Primary Examiner*—Nasser Moazzami
(74) *Attorney, Agent, or Firm*—Beth L. McMahon; Charles A. Johnson; Mark T. Starr

(57) ABSTRACT

A mechanism to selectively leak data signals from a cache memory is provided. According to one aspect of the invention, an Instruction Processor (IP) is coupled to generate requests to access data signals within the cache. Some requests include a leaky designator, which is activated if the associated data signals are considered "leaky". These data signals are flushed from the cache memory after a predetermined delay has occurred. The delay is provided to allow the IP to complete any subsequent requests for the same data before the flush operation is performed, thereby preventing memory thrashing. Pre-fetch logic may also be provided to pre-fetch the data signals associated with the requests. In one embodiment, the rate at which data signals are flushed from cache memory is programmable, and is based on the rate at which requests are processing for pre-fetch purposes.

55 Claims, 4 Drawing Sheets

DELAYED LEAKY WRITE SYSTEM AND METHOD FOR A CACHE MEMORY

RELATED APPLICATIONS

The following co-pending applications of common assignee have some subject matter in common with the current application:

Ser. No. 10/255,393 entitled "Data Pre-fetch System and Method for a Cache Memory", filed on even date herewith, and incorporated herein by reference in its entirety.

FIELD OF THE INVENTION

The present invention generally relates to methods and apparatus for controlling a cache memory, and more particularly relates to controlling flushing of data from the cache memory.

DESCRIPTION OF THE PRIOR ART

It is known in the prior art to develop computer systems having cache memory(s) built into the basic architecture. The two fundamental characteristics of any memory unit are capacity (i.e., number of storage cells) and speed. The cost of a memory unit is, of course, increased with increased capacity and/or increased speed. Because of the time delays necessitated by increased size, memory systems that are both very large in capacity and very fast tend to be cost prohibitive.

Therefore, for virtually all general-purpose computers, cost requirements dictate that the main storage subsystem will operate more slowly than the processor(s) that it serves. Therefore, there tends to be a constant mismatch between the rate at which data is to be accessed from the main storage subsystem and the rate at which that data is processed. Thus, a constant performance issue with computer design is related to reduction of the latencies associated with the wait between a processor request for memory access and the time when that request is actually honored by the main storage subsystem.

A common technique for matching a relatively high-speed processor to a relatively low speed main storage subsystem is to interpose a cache memory in the interface. The cache memory is much faster but of much smaller capacity than the main storage subsystem. Data requested by the processor is stored temporarily in the cache memory. To the extent that the same data remains within the cache memory to be utilized more than once by the processor, substantial access time is saved by supplying the data from the cache memory rather than from the main storage subsystem. Further savings are realized by loading the cache memory with blocks of data located near the requested data under the assumption that other data will be soon needed from the loaded block.

There are additional issues to be considered with regard to cache memory design. Program instruction data, for example, tends to be quite sequential and involves only read accesses. However, operand data may be both read and written. If a computer system contains multiple processing units, provision must be made to ensure that data locations accessed by a first processing unit are provided as potentially modified by write operations from a second processor unit. This data coherency problem may be solved via the use of store-through memory wherein write operands are immediate transferred to a higher level in the memory structure. Alternatively, store-in cache memories utilize flags to show that memory locations contain updated data.

As the use of cache memory has become more common, it is now known to utilize multiple levels of cache memory within a single system. U.S. Pat. No. 5,603,005, issued to Bauman et al. on Feb. 11, 1997, incorporated herein by reference, contains a description of a system with three levels of cache memory. In the multiprocessor Bauman et al. system, each instruction processor has dedicated instruction and operand cache memories. This corresponds to level one cache memory. A shared level two cache memory is coupled to multiple instruction processors. Additionally, a level three cache is coupled between each of the level two cache memories and a corresponding main memory unit.

It is axiomatic that the capacity of a cache memory is less than that of main storage. Therefore, after a period of time, a cache memory typically fills up completely necessitating a flushing of some of its contents before any new data may be added to the cache memory. For a store-in level two cache memory, such as taught by Bauman et al., data modified by input data from an input/output processor or an operand write from an instruction processor must be stored within the level three cache memory and/or main storage, because it is the most current data.

A primary key to efficiency within a cache memory architecture is the process whereby some of the data within a cache memory is chosen to be flushed to accommodate newly requested data. This is particularly important for the level two, store-in cache memory of Bauman et al., because the flushing process necessitates writing the changed data to the level three cache memory.

The most common technique known in the prior art for choosing which data to flush is called least recently used (LRU). This approach is based upon a determination of which data has been latent within the cache memory for the longest period of time without being utilized for processing. U.S. Pat. No. 5,625,793, issued to Mirza on Apr. 29, 1997, suggests a change in the LRU technique.

Commonly assigned patent application entitled "Leaky Cache Mechanism", U.S. Ser. No. 09/650,730 filed Aug. 30, 2000, describes certain read and write instructions that are included within the processor repertoire that can modify the LRU mechanism of the system. When execution of any of these commands occurs, a "release ownership" signal is sent to a system controller that includes a level two cache. This signal indicates that the data associated with the command need not be maintained within the level two cache. If a cache hit occurs during completion of the write instruction, the data access is completed and the data is tagged as least (rather than most) recently used. As a result, the data will be flushed as soon as additional space is needed. When the access request results in a cache miss, the data is retrieved and provided to the requesting instruction processor, but is not replaced within the cache. Although this mechanism provides a way to modify the LRU mechanism, it results in immediate flushing of data from the cache. No mechanism is provided to selectively adjust, or delay, the time at which the flushing occurs.

What is needed, therefore, is an improved system and method for controlling the flushing of data from a cache memory that addresses the foregoing issues.

SUMMARY OF THE INVENTION

The present invention overcomes many of the disadvantages associated with the prior art. The current invention provides a mechanism to selectively "leak", or flush, data signals from a cache memory. In one embodiment, this data is flushed to a main memory so that other processors can access the data more quickly than if the signals were retrieved from the cache.

According to one aspect of the invention, an Instruction Processor (IP) generates requests to access data signals within the cache. Each request includes a leaky designator. If a leaky designator is activated, the associated data signals are considered "leaky". Leaky write control logic is provided to flush this leaky data from the cache memory after a predetermined delay has occurred. The delay, which may be programmable, is provided to allow any intervening cache references to the same data to be completed before the data is flushed from the cache. This prevents memory thrashing.

In one embodiment, the invention further includes pre-fetch control logic to pre-fetch data that is requested by the IP. When the IP generates a request to access data signals within the cache, an associated pre-fetch request is provided to pre-fetch control logic. This logic determines whether the data signals are available within the cache. If not, the data signals are retrieved from another memory within the data processing system, and are stored to the cache. If the request to access the data signals is provided to the cache after processing for the pre-fetch request has completed, the access request may be completed to the cache without resulting in a cache miss.

According to another embodiment of the invention, leaky data is flushed from the cache memory at a rate that is based on a programmable value. This rate may be determined based on the rate at which requests are processed by the pre-fetch logic. More specifically, each time the IP generates certain types of requests to access data within the cache, an associated pre-fetch request is stored within a storage device that is coupled to the pre-fetch control logic. Pre-fetch control logic processes these requests in the order they are stored within the storage device. While pre-fetch control logic is processing pre-fetch requests, leaky write control logic is also processing these requests in the same order. However, in one embodiment, leaky write control logic lags pre-fetch processing by a predetermined number of requests. That is, leaky write control logic is always processing a request that was stored to the storage device at least a predetermined number of requests before the request that is being processed by pre-fetch control logic. In one embodiment, this predetermined number of requests is programmable. This effectively matches the rate of pre-fetch processing to the rate of flush processing, and further inserts a delay between the time a pre-fetch request is received and the time associated data is flushed from the cache. As discussed above, this delay ensures that, in most cases, the request to access the data is completed after the pre-fetch operation completes but before the data associated with the request is flushed. Additionally, subsequent access requests to the same data will also generally complete before the flush operation occurs so that memory thrashing is prevented.

In an alternative embodiment of the invention, a timer may be used to control the rate at which flushing of data occurs. For example, a programmable time delay may be inserted between sequential flush operations to control the rate at which data is flushed from cache. This embodiment does not match the rate of data flushing to that of pre-fetching.

According to another aspect of the invention, only pre-determined types of requests are stored within the storage device and processed for pre-fetch and flush purposes. In one embodiment, only write requests are stored within the storage device and processed in the manner discussed above. In another embodiment, a filter may be used to prevent certain requests from being stored within the storage device. For example, if two requests are associated with the same address, the subsequent request will not be stored within the storage device. In one embodiment, this filter only operates when the two requests are received sequentially. In another embodiment, the filter operates only if two requests are received sequentially within a predetermined time period. According to yet another embodiment, the filter is programmable.

According to another aspect of the invention, a system to selectively flush data from a cache is disclosed. The system includes a storage device to store a request address, and a programmable leaky write control circuit coupled to the storage device to initiate the flushing from the cache of data addressed by the request address.

In another embodiment, a method of flushing data from a cache memory is described. The method includes the steps of referencing data signals stored within the cache memory, and flushing the data signals from the cache memory after a predetermined delay has occurred.

According to another aspect, a method for managing a cache memory is provided that is adapted for use in a data processing system including an IP coupled to a cache memory. The method includes providing a pre-fetch request from the IP to the cache memory, determining whether data identified by the pre-fetch request is stored within the cache memory, and pre-fetching the data if the data is not stored within the cache memory. The method further includes flushing the data from the cache memory at a time determined by a programmable control value.

Another embodiment of the invention comprises a system for transferring data from a first memory to a second memory. The system includes a storage device to store an address identifying associated data signals, and leaky write control logic coupled to the storage device to initiate the transfer of the data signals from the first memory to the second memory at a time controlled by a programmable value.

Still another aspect of the invention provides for a system for flushing data from a cache memory. The system comprises means for pre-fetching data signals for the cache memory, and means for flushing the data signals from the cache memory after a predetermined delay has occurred.

Other scopes, aspects, and embodiments of the current invention will become apparent from the following description and the accompanying drawings

DETAILED DESCRIPTION OF THE DRAWINGS

Figure 1:
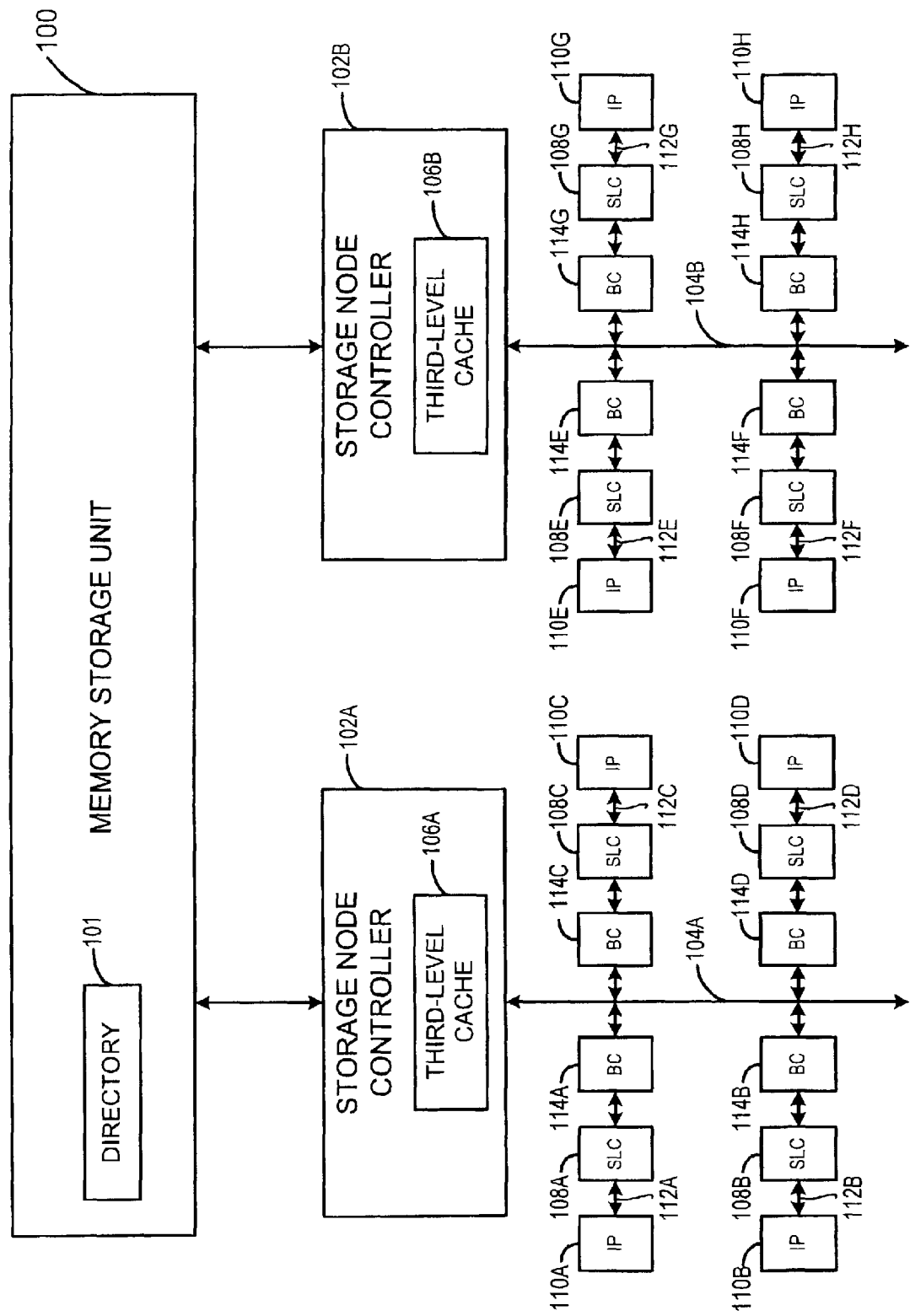
FIG. 1 is a block diagram of an exemplary data processing system of the type that may employ the current invention.

FIG. 1 is a block diagram of an exemplary data processing system that may employ the current invention. The system includes a memory storage unit (MSU) 100 that provides the main memory facility for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU retains information in directory 101 that indicates where the latest copy of requested data resides within the system. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a cache line.

MSU is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface.

Each SNC includes logic to interface to the high-speed MSU interface, and further includes logic to interface to a respective processor bus such as processor buses 104A and 104B. These processor buses can employ any type of bus protocol. Each SNC may further include a respective cache and all supporting logic. This cache may be a Third-Level Cache (TLC), a Fourth-Level Cache (4LC), or some other type of cache memory. In the embodiment shown, SNCs 102A and 102B include TLCs 106A and 106B, respectively.

As noted above, each of SNCs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local caches may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

An SNC, its respective processor bus, and the entities coupled to the processor bus may be referred to as a "processing node". In the current example, SNC 102A, processor bus 104A, and all entities associated with processor bus including BCs 114A–114D, SLCs 108A–108D, and IPs 110A–110D may be referred to as a processing node. Similarly, SNC 102B, processor bus 104B, and all entities associated with processor bus 104B comprise a second node.

During execution, an IP is accessing programmed instructions and data from MSU 100 and its respective caches. For example, when IP 110A requires access to a memory address, it first attempts to retrieve this address from its internal cache(s) such as an FLC. If the requested address is not resident in the FLC, a request is tent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request provided by SLC 108A on processor bus 104A. If any of these SLCs stores the requested data, it will be returned to requesting SLC 108A via processor bus 104A. Additionally, SLCs 108B–108D may have to invalidate any stored copies of the data depending on the type of request made by SLC 108A. This is discussed further below.

SNC 102A also snoops the request from SLC 108A. SNC 102A determines whether TLC 106A stores the most recent copy of the requested data. If so, the data will be provided by SNC 102A to the SLC 108A.

In some instances, data requested by IP 102A is not resident within any of the cache memories associated with processor bus 104A. In that case, SNC 102A must forward the request to MSU 100. MSU 100 determines the location of the current copy of the requested data using information stored within its directory 101. The most current copy may reside within the MSU itself, or may reside within a cache memory that is associated within one or more other nodes in the system, as indicated by state bits within directory 101. In the former case, the MSU provides the data directly to SNC 102A. In the latter case, the MSU must issue a "return" command to these other node(s) requesting that the data be returned to MSU 100 so that it may be forwarded to SNC 102A.

In the current example, it will be assumed that the requested data is retained by SNC 102B. Therefore, MSU issues a request to SNC 102B to prompt return of the data. Assume further that SNC 102B determines, based on stored state bits, that SLC 108E stores a valid copy of the cache line that has been modified. SNC 102B therefore issues a request on processor bus 104B for return of the modified data. SLC 108E, which is snooping bus 104B, intercepts the request and responds by returning the data to SNC 102B. In some instances, SLC 108E may retain a read-only copy of the returned data, and in other cases, SLC 108E must invalidate its copy. For example, a read-only copy may be retained if IP 110A is requesting a read-only copy. If the data is being requested for update purposes, however, SLC 108E must invalidate its copy. These details are largely beyond the scope of the current invention and are not discussed in detail. Additional information regarding a directory-based coherency scheme for use in a multiprocessor platform is discussed in the commonly assigned U.S. Patent Application entitled "Directory Based Cache Coherency System Supporting Multiple Instruction Processor and Input/Output Caches" referenced above.

After SNC 102B obtains the requested data, that data is forwarded to MSU 100, which then provides it to SNC 102A. MSU 100 further updates directory 101 so that the location of the most up-to-date copy of the data is recorded. SNC 102A provides the data to requesting IP 110A via SLC 108A so that execution may continue.

In the system of the current embodiment, data is retrieved from, and written to, MSU 100 in cache lines, where a cache line of the current embodiment is defined as 128 contiguous bytes of memory. A cache line having any other size may be selected in the alternative. As discussed above, directory 101 records directory information on a cache-line basis. The various caches within the system also track memory on a cache-line basis.

It will be understood that the data processing system of FIG. 1 is merely exemplary. That system may include more or fewer SNCs, SLCs, and/or IPs. Additionally, many other types of system architectures may usefully employ the current invention as will be apparent from the following discussion.

As will be appreciated by the description set forth above, when a cache miss occurs to a processor's FLC or SLC, obtaining the requested data may be timeconsuming. This is particularly true if the data must be retrieved from MSU 100 or from another node within the system. To reduce the latency associated with data retrieval following a cache miss, some systems implement a pre-fetching mechanism, as-discussed above. The system retrieves data from the main memory, if necessary, in anticipation of requiring that data for a read or write operation. When that operation finally occurs, the data will already reside within the processor's FLC or SLC so that latency is minimized.

Figure 2:
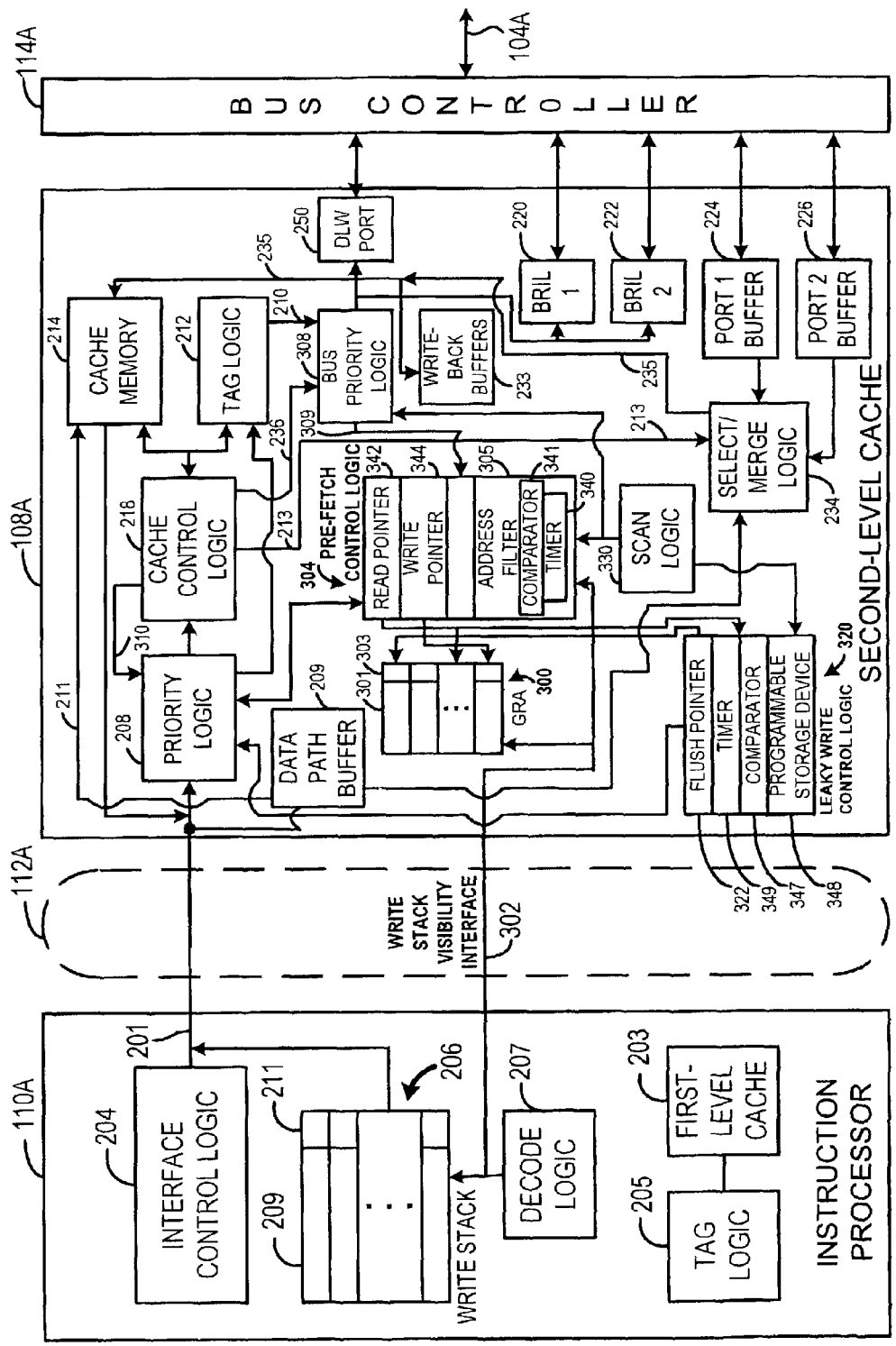
FIG. 2 is a block diagram of one embodiment of the current invention that is adapted for use within a data processing platform similar to that of FIG. 1.

FIG. 2 is a block diagram of one embodiment of the current invention that is adapted for use within a data processing platform similar to that of FIG. 1. IP 110A is coupled via interface 112A (shown dashed) to SLC 108A. Interface 112A includes a primary interface 201, that supports data transfers between IP 110A and the SLC 108A for read and write operations. In one embodiment, the primary interface consists of an independent instruction read port having address and data lines. The primary interface further includes an operand port that supports operand read and write requests. The operand port includes address and function signals, and independent read and write data paths.

IP 110A includes a First-Level Cache (FLC) 203 coupled to tag logic 205. In the current embodiment, FLC is a store-through, set associative cache that stores both instructions and operands on a cache line basis. The addresses of the cache lines stored within FLC are recorded by tag logic 205. When a cache miss occurs to FLC 203, the requested cache line is retrieved from SLC 108A, or from one of the other memories within the system via primary interface 201.

IP 110A further includes a write stack 206 to store pending write operations. When IP decode logic 207 decodes an instruction that involves an operand write operation, the write operaton is completed to FLC 203. Additionally, because the FLC is a store-through cache, the write operation is scheduled for presentation to SLC 108A. This is accomplished by storing a write request within write stack 206. This request includes a request address and data. Thereafter, the IP may continue instruction execution as if the request were completed. This increases system throughput because the IP is not stalled waiting for the SLC to complete the request.

In one embodiment, write stack 206 stores up to sixteen write requests, although this capacity may be increased or decreased in another embodiment. For each request, the write stack indudes one or more fields 209 to store the address, a functon code, and data for the request. A field 211 is provided to store a "leaky designator" that indicates whether the write request is to be considered "leaky". If this designator is set, the data will be written back to MSU 100 sometime after the write request is completed to the SLC 108A. This allows other processors within the system to more efficiently access the data. This will be discussed further below.

Write stack 206 is coupled to a dedicated Write Stack Visibility (WSV) interface 302. When decode logic 207 stores the address, function code, and data into write stack 206, the request address, function code, and leaky designator are also transferred over write stack interface 302 to SLC 108A. This information is stored in a storage device shown as General Register Array (GRA) 300 within SLC 108A. In one embodiment, GRA 300 includes sixty-four storage locations, each being fifty bits wide, although other sizes may be employed in an alternative embodiment. GRA may be used as a circular queue, such that requests are stored to sequential addressable locations within the GRA as they are received. When a request is written to the last storage location within GRA 300, the next request will be stored within the first location, if available, and so on.

GRA 300 is coupled to pre-fetch control logic 304. Pre-fetch control logic controls the storing of the requests within the GRA 300. A write pointer 344 is maintained to indicate which storage location with GRA 300 will store the next request. Pre-fetch control logic 304 may further include an address filter 305 to control which write request addresses will be stored within GRA 300, as will be discussed further below.

Pre-fetch control logic 304 performs pre-fetch processing on the requests that are stored within GRA 300. Pre-fetch control logic maintains a read pointer 342 that points to the oldest request that is stored within GRA 300 that has not yet undergone pre-fetch processing. When pre-fetch processing is completed on a previous request, pre-fetch control logic 304 retrieves the request that is indicated by read pointer 342, and provides this request to priority logic 208. Priority logic 208 schedules this request for presentation to tag logic 212, which determines whether the requested address is resident within cache memory 214. If not, the cache miss status is communicated to bus priority logic 308 on line 210 so that bus-priority logic may generate a pre-fetch request to obtain the cache line. When the request gains priority, the pre-fetch request is written to the available one of BRILL port 220 or BRIL 2 port 222, and is presented to processor bus 104A via BC 114A. The request is fulfilled when the requested cache line is returned to either port 1 buffer 224 or port 2 buffer 226 as discussed above, depending on whether BRILL port 220 or BRIL2 port 222 initiated the request.

When the data is available within a port buffer, bus priority logic 308 provides a packet of request information on interface 309 to pre-fetch control logic 304. This packet of information includes the original request address and an indication as to which port stores the returned data. Pre-fetch control logic 304 responds by generating a cache replacement request to priority logic 208, which schedules the request for processing. Pre-fetch control logic 304 also provides an indication to cache control logic 218 regarding the location of the returned data. When the cache replacement request gains priority, cache control logic 218 provides control signals on line 213 to direct select/merge logic 234 to select the returned data from the appropriate one of port 1 buffer 224 or port 2 buffer 226. The selected data is stored to cache memory 214 over interface 235 under the direction of cache control logic 218. It will be noted that in this scenario, select/merge logic 234 does not perform any type of merge operation on the cache line data. Merge operations will be discussed below in regards to other scenarios.

The foregoing description assumes that the pre-fetch operation is completed before the initiation of an associated write request over primary interface 201. In this case, the associated write request remains stored within write stack 206 until after the cache line associated with the write request is stored within cache memory 214. When this write request gains priority, it is presented by interface control logic 204 to priority logic 208 over primary interface 201. The write data for the request is stored within data path buffer 209, and the request is then queued waiting for availability of tag logic 212. When the write request is provided to tag logic 212, a cache hit will result because the cache line was already retrieved, if necessary, by the pre-fetch operation described above. Additionally, this pre-fetch operation acquired the access privileges that are required to allow the write operation to complete. In the current embodiment, the pre-fetch operation acquires the cache line with "exclusive ownership" privileges, meaning that the copy of the cache line stored within cache memory 214 is an exclusive copy that may be updated within cache memory 214. Because the data is resident in cache memory with the appropriate exclusive ownership privileges, the data from data path buffer 209 may be transferred over data path 211 to cache memory 214 so that the write operation is completed.

As previously noted, the foregoing scenario involves the case wherein the pre-fetch operation is completed before SLC 108A receives the associated write request so that a cache hit results. In another instance, the issuing of the write request may result in a cache miss because a previously issued pre-fetch request has not yet completed. Bus priority logic 308 is alerted of the cache miss via control signals from tag logic 212 provided on lines 210. In this case, request processing will depend on whether some of the requested data has already been stored within either port 1 buffer 224 or port 2 buffer 226. If some data has already been stored within one of the port buffers, the replacement operation may be completed in the manner described above. That is, bus priority logic 308 provides a packet of information on line 309 to pre-fetch control logic 304 that includes the request address for the returned data. In response, pre-fetch control logic 304 generates a replacement request to priority logic 208, which schedules this request for completion by cache control logic 218 and tag logic 212. When the replacement request gains priority, cache control logic 218 causes select/merge logic 234 to select data from either the port 1 or port 2 buffer. This data is written to cache memory 214 via interface 235.

When bus priority logic 308 determines that the cache replacement operation is underway and will be completed within a predictable time frame, bus priority logic signals cache control logic 218 to convert the pending write request that was received over primary interface 201 to a "stack" request. A stack request is a special request type that is used when a original request could not be processed because of a memory conflict. In response, cache control logic 218 provides a signal to priority logic 208 via interface 310 indicating that the write request should be re-issued as a stack request. Because priority logic 208 always temporarily stores original request information, the information for the original write request is available to generate the stack request. When the write request gains priority, it is presented to tag logic 212, where it results in a cache hit. The write data stored in data path buffer 209 may then be written over data path 211 to cache memory 214 so that the operation is completed.

In still another scenario, a pre-fetch request is pending within BRIL1 220 or BRIL2 222 when the associated write request is received on primary interface 201, and a cache miss results. Unlike the previous case, however, the pre-fetch request has not progressed to the point where data is available. When data is returned to either port 1 buffer 222 or port 2 buffer 224, bus priority logic 308 signals cache control logic 218 of the availability and location of the data, and indicates that an "operand write replace" operation is to be performed to cache memory 214. In response, cache control logic 218 provides control signals on line 213 to select/merge logic 234. These signals select the returned cache line, and merge the write data from data path buffer 209 with the cache line. The updated cache line is written to memory on interface 235, and the operation is completed.

As described above, any request for data that is made to processor bus 104A results in return of a 16-word cache line. In one embodiment of the invention, bus priority logic 308 generates the requests to indicate the order in which the data words are to be returned on processor bus 104A to the SLC 108A. Specifically, for any request type that is associated with data modification such as a write request or an associated pre-fetch request, bus priority logic 308 generates a request that indicates that the portion of the cache line that is to be modified should be returned first. This simplifies the above-described merge operation, since it can always be performed to that first-returned data portion.

Although in many cases, a pre-fetch request is presented across WSV interface 302 before the associated write request is presented across primary interface 201, this is not always the case. For example, when a request is stored to an otherwise empty write stack 206, the write request will be provided via primary interface 201 at substantially the same time the request address is provided over WSV interface 302. Because the processing of pre-fetch requests are considered background tasks that are not granted high priority by priority logic 208, priority logic will grant higher priority to the write request, which will be scheduled first for presentation to tag logic 212. If this write request results in a cache miss, it is scheduled to processor bus 104A by bus priority logic 308. When bus priority logic later sees the cache miss that results from the later-issued pre-fetch request, bus priority logic provides a "resume" signal on line 309. As a result, pre-fetch control logic 304 increments its read pointer 342 to continue pre-fetch processing with the next request that is stored within GRA 300. The previous pre-fetch request is considered complete.

Still other situations exist wherein a write request presented to tag logic 212 results in a cache miss. For example, a pre-fetch request may have been processed so that a cache line is obtained and written to cache memory 214. Later, a request for this cache line is driven onto processor bus 104A by one of SLCs 108B–108D or SNC 102A before the write request for the data is received by SLC 108A. In response to the request, SLC 108A relinquishes the cache line, which is "snooped away" by the other entity on the processor bus 104A. When the write request is finally processed, a cache miss occurs. Bus priority logic 308 schedules the write request to the processor bus so that the cache line may be re-acquired. When data is returned, the request is completed using an available one of BRIL1 220 or BRIL2 222 as described above. The cache line data is merged with the write data from data path buffer 209 in the manner discussed above, and the updated cache line is written to cache memory 214.

Another aspect of the current invention involves address filter 305, which is included in pre-fetch control logic 304. This filter prevents certain write addresses from being stored within GRA 300. In one embodiment, a request address is not stored within GRA 300 if comparator 341 matches the address to the address that was most recently stored within GRA 300. As a result, only a single GRA entry is created when a sequence of write requests to the same cache line is encountered, and only a single pre-fetch operation for the cache line will be initiated. In another embodiment, the filter may be designed so that only one request to the same cache line is stored within GRA 300 at a given time, regardless of whether the requests to the same cache line are time-sequential.

Address filter provides important benefits over prior art designs because it prevents two requests for the same cache line to be pending simultaneously to processor bus 104A. Some bus protocols, such as the one employed by processor bus 104A in the exemplary embodiment, dictate that two requests for the same cache line may not be pending simultaneously on the bus. To conform to this protocol, when two sequential pre-fetch requests are processed, the second request cannot be issued on processor bus 104A. Some prior art systems handle this situation by temporarily storing the second request within an unused one of the bus request ports, which in the current system include BRIL1 port 220 and BRIL2 port 222. When this occurs, the port cannot be used for any other requests, decreasing throughput. When address filter 305 is used, this problem is eliminated, since GRA 300 will not store sequential requests to the same cache line.

In still another embodiment, address filter 305 includes a timer 340. The timer is used to filter out sequential requests to the same cache line only if the requests are not separated by a predetermined time period. If more than the predetermined time span separates the receipt of the sequential requests, another entry in GRA 300 will be created for the second request even though it is directed to the same cache line as the previously received request. In this latter case, enough time has elapsed that is considered necessary to perform the pre-fetch operation to ensure that the target cache line has not been snooped away by a request presented on processor bus 104A. Timer 340 is programmable by scan logic 330 to allow for selection of the predetermined value.

In still another embodiment, address filter 305 is programmable using scan logic 330. In this embodiment, any of the alternative modes for address filtering described above may be selected based on user preference.

According to still another aspect of the invention, pre-fetch control logic 304 does not create entries within GRA 300 for all types of write requests that are provided over WSV interface 302. For example, some special read-lock-and-modify commands are used to retain exclusive, locked access to a cache line. When these types of commands are executed, the cache line will always be resident in cache memory 214 before a write request to the cache line is issued over primary interface 201. For this reason, pre-fetch control logic 304 does not generate an entry in GRA 300 when this type of write request is transferred over WSV interface 302, as is determined from the function code that is provided with the address.

Other aspects of the pre-fetch mechanism of the current system are beyond the scope of the current invention, and are described in the U.S. patent application Ser. No. 10/255,393 entitled "Data Pre-fetch System and Method for a Cache Memory", filed on even date herewith, and incorporated herein by reference in its entirety.

The foregoing discussion relates primarily to the pre-fetching of cache lines in preparation for performing cache write operations. According to the current invention, a mechanism is provided to flush selected ones of the pre-fetched cache lines back to MSU 100 after a predetermined time period has elapsed. This flushing of cache line data is controlled using the leaky designators stored within field 211 of write stack 206 as follows.

When a write request is stored within write stack 206, the respective leaky designator is stored within field 211. This leaky designator is active if the cache line that is to be updated by the write request is to be "leaked", or flushed, back to MSU 100 sometime after the update is performed.

A leaky designator may be set because the associated cache line is stored within a "leaky bank" in MSU 100. A leaky bank is an area of memory that stores operands and instructions likely to be shared between processors. Instructions and/or operands may be assigned to leaky banks by intelligent compilers when the instruction code is compiled. When IP 110A retrieves operands or instructions from MSU 100, MSU provides the IP with bank descriptor address information, including whether or not the retrieved operands or instructions were retrieved from a leaky bank. This information is stored within the IP, and is used to set the leaky designators. In particular, in one embodiment, any cache line retrieved from the leaky bank will have its leaky designator set by the IP within write stack 209 when predetermined write operations are initiated to the cache line by the IP.

In another embodiment, a leaky designator is set by a software process that is executing on the IP with a privilege level of "leaky". A process is granted a leaky privilege level because it is likely to share data with a process running on one or more IPs within other processing nodes. For example, an operating system is likely to be assigned a privilege level of "leaky".

In still another embodiment, decode logic 207 or other circuitry within the IP may indicate that certain instruction types should be leaky because the associated data is likely to be used by someone else. In this instance, the leaky designator may be set during instruction decode. Other mechanisms for setting a leaky designator are possible within the scope of the current invention. In any event, the leaky designator is activated if it is known that the cache line data that is being updated by the write operation will likely be needed by one or more processors in other processing nodes within a relatively short time period after the current write request is completed. Leaking the cache line back to MSU 100 allows the updated data to be retrieved more quickly by the one or more other processors.

The leaking of cache lines from cache memory 214 is controlled by leaky write control logic 320. Leaky write control logic 320 includes a flush pointer 322, which points to the next request within GRA 300 that is to be processed for cache flush purposes, as will be discussed below. A request is to be flushed if the leaky designator is set, as described above. In GRA 300, this designator is stored within field 303, with respective address and function code signals being stored in one or more fields shown as fields 301.

When leaky write control logic 320 determines that a request is to be processed for flush purposes, the request that is pointed to by flush pointer 322 is retrieved from GRA 300. If the leaky designator for the request is not activated, processing is considered complete. Otherwise, the request is provided as a delayed leaky write request to priority logic 208. Priority logic 208 prioritizes this request along with all other requests that are waiting to gain access to tag logic 212, including all cache read and write requests, and pre-fetch requests. Because the leaky write operation is considered a background task, priority logic 208 of the current embodiment grants delayed leaky write requests a lower priority than those requests received over primary interface 201.

The delayed leaky write request eventually gains priority and is presented to tag logic 212. If the cache line associated with the request is no longer resident in cache memory 214, as may be the case because of an intervening request from processor bus 104A, the delayed leaky write request is considered complete. Otherwise, the cache line is invalidated by tag logic 212.

In one embodiment, a delayed leaky write request only invalidates the cache line if the cache line has been modified, as indicated by state bits stored within tag logic 212. It will be noted that in a system similar to the exemplary embodiment of FIG. 2, leaky write requests are issued following write requests to update the cache line data. In this type of embodiment, the cache line associated with a delayed leaky write request will almost always be in a modified state, and will therefore be invalidated. In the rare situation the cache line has not been modified, the cache line is allowed to remain within cache memory 214 so that if the associated write request has not yet been provided to the cache, a cache hit will occur when that request is presented to tag logic 212.

After a modified cache line is invalidated, it is written from cache memory 214 to background write-back buffers 233 on interface 235. These background write-back buffers are dedicated to storing data written back to memory during background tasks, such as the delayed leaky write operations. Background write-back buffers may include one or more storage devices capable of storing one or more cache lines. In one embodiment, background write-back buffers 233 include two separate buffers, each capable of temporarily storing a respective cache line that is waiting to be transferred over processor bus 104A.

While data is written to background write-back buffers 233, an associated delayed leaky write request is generated by bus priority logic 308. When the request gains priority, it is written to Delayed Leaky Write (DLW) port 250, which provides the request to BC 114A. In response, BC 114A issues a flush cache line request on processor bus 104A. The flush cache line request is snooped by SNC 102A, causing any copy of the cache line stored within TLC 106A to be invalidated. If the SNC retains the latest copy of the data, that copy is returned to MSU 100. Otherwise, any updated data provided by SLC 108A is forwarded to MSU 100. State bits within directory 101 are modified to record that the most current copy of the cache line is stored within the MSU, and that the MSU "owns", or has the exclusive copy of, this cache line.

As noted above, leaky write control logic 320 includes logic to determine when a request is to be retrieved from GRA 300 and processed for flush purposes. It is important to control the timing of request processing for several reasons. If a cache line is not flushed soon enough, a processor within another node that requires use of the cache line will be forced to retrieve that cache line from SLC 108A, which is more time consuming than retrieving that cache line from MSU 100. On the other hand, if the cache line is flushed too soon, subsequent write requests by IP 110A to the same cache line will result in a cache miss and the initiation of another pre-fetch operation. This results in memory thrashing.

In one embodiment, the timing associated with flush request processing is controlled using read pointer 342. More specifically, leaky write control logic 320 is programmed so that a flush request is not presented to priority logic 208 unless flush pointer 322 lags behind read pointer 342 by a programmable number of requests. This programmable number of requests may be stored within programmable storage device 348 by scan logic 330 using a scan shift operation, as known in the art. This throttling mechanism effectively controls the amount of time a cache line resides within cache memory 214 between the time it is pre-fetched from, and flushed back to, MSU 100.

The above-described mechanism may best be understood by example. Assume that requests are stored within the storage locations of GRA 300 in order, starting with the first location, as those requests are generated. Further assume that GRA 300 currently stores six requests, with read pointer 342 pointing to the fifth storage location storing the fifth request, and flush pointer 322 pointing to the second storage location storing the second request. In this example, leaky write control logic 320 is programmed so that the address pointed to by flush pointer will not be provided to priority logic 208 until flush pointer 322 lags read pointer 342 by four requests. Therefore, the next flush request is not provided until read pointer 342 is advanced to point to the sixth request. This throttles the flushing of cache lines so that memory thrashing does not occur.

In one embodiment, comparator 347 compares the value of read pointer 342 on line 350 to the sum of the value of flush pointer 322 and the value stored within programmable storage device 348. If the value of read pointer is greater than, or equal to, this sum, lead write control logic 320 is enabled to provide another flush request to priority logic 208. Other implementations are, of course, possible within the scope of the current invention.

As discussed above, within the current system, a pre-fetched cache line should remain within cache memory 214 long enough for the associated write request to complete. Additionally, it is desirable for the cache line to remain within cache memory 214 long enough for any subsequent write requests to the same cache line to complete. Leaky write control logic 320 may be programmed so that flush pointer 322 lags read pointer 342 by a large enough number of requests so that this goal is accomplished in most situations. The programming of leaky write control logic 320 may be tuned to a particular software application or even to a particular system so that memory thrashing is minimized.

In another embodiment, leaky write control logic 320 could include a timer-counter 349 to control the time between the processing of subsequent flush requests. Although this embodiment throttles leaky write control logic 320, it does not take into consideration the rate at which requests are being processed by pre-fetch control logic 304, and therefore is not preferred. Other mechanisms for throttling the requests are possible within the scope of the current invention.

While controlling the processing of flush requests helps reduce memory thrashing, this problem is also eliminated through the use of request filtering. As discussed above, pre-fetch control logic 304 filters requests so that, in one embodiment, only the first in a sequence of requests to the same cache line are stored within GRA 300. In another embodiment, the filter may be designed so that only one request to the same cache line is stored within GRA 300 at a given time, regardless of whether the requests to the same cache line are time-sequential. In either of these embodiments, the filtering function removes duplicate cache lines from GRA 300, making it highly unlikely that both read pointer 342 and flush pointer 322 point to two requests associated with the same cache line, thus reducing the chance of memory thrashing. Moreover, because the filtering function removes some of the write requests stored within write stack 206 from the visibility of pre-fetch control logic 304 and leaky write control logic 320, the delay between the time a request is processed by pre-fetch control logic and the time the cache line is flushed by leaky write control logic is increased. This is so because the filtered requests stored in write stack 206 must be processed by priority logic 208 and tag logic 212, slowing the processing of the pre-fetch and flush requests. As a result, the possibility of memory thrashing is even further reduced.

Figure 3:
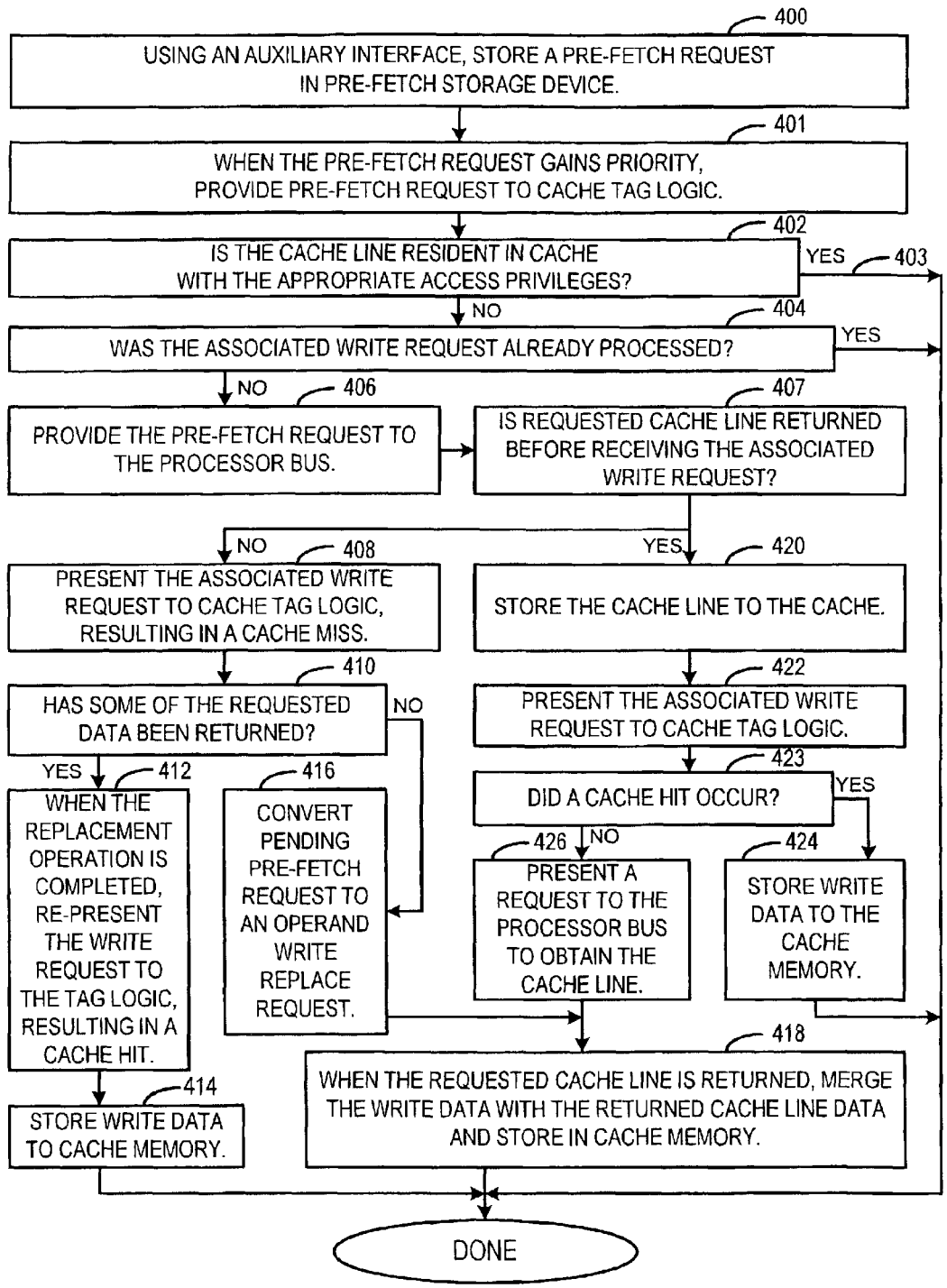
FIG. 3 is a flow diagram illustrating one method of processing pre-fetch requests.

FIG. 3 is a flow diagram illustrating one method of performing pre-fetch processing. Using an auxiliary interface that couples IP 110A to SLC 108A, a pre-fetch request is stored into a pre-fetch storage device (400). In FIG. 2, the auxiliary interface is shown as WSV interface 302, and GRA 300 is provided as the pre-fetch storage device. When the stored pre-fetch request gains priority, the request is provided to tag logic 212 (401). In the current embodiment, requests are processed in the order they are stored within GRA 300. Priority logic 208 determines when a request is presented to tag logic 212 based on a predetermined priority scheme that takes into account all requests that are pending to the cache.

If the cache line associated with the pre-fetch request is resident within cache memory 214 with the appropriate access privileges (402), the pre-fetch request may be considered complete as shown by arrow 403. Otherwise, bus priority logic 308 determines whether the associated write request was already processed by tag logic 212 such that a request for the cache line is already pending (404). If so, processing of the current pre-fetch request is considered complete, as shown by arrow 403. Bus priority logic 308 therefore issues a resume signal to pre-fetch control logic 304, and processing is initiated on the next request that is scheduled for pre-fetch processing. Otherwise, the pre-fetch request is provided to the processor bus via BC 114A (406). In one embodiment, this is accomplished by writing the request to an available one of BRIL1 220 or BRIL2 222 for presentation to the bus.

If the requested cache line is not returned prior to receiving the associated write request over primary interface 201 (407), the write request is presented to the cache tag logic, resulting in a cache miss (408). If some of the requested data has already been returned at this time (410), the replacement operation is allowed to complete. Then the write request is re-presented as a stack request to the tag logic, resulting in a cache hit (412). The write data is stored to cache memory, and the operation is considered completed (414). Returning to decision step 410, if none of the requested data has been returned when the cache miss occurs, the pending pre-fetch request is converted to an operand write replace request (416). When the requested cache line is returned, the cache line data is merged with the write data, and the updated cache line is stored within the cache (418).

Returning now to decision step 407, if the request cache line is returned before the associated write request is received, the cache line is stored to the cache memory (420). Sometime later, the associated write request is presented to the tag logic (422). If a cache hit occurs (423), the write data is stored to the cache memory, and the operation is considered complete (424). Otherwise, if a cache miss occurs, the pre-fetched cache line was snooped away before the write request was presented to the cache memory. In this case, the write request is presented to the processor bus to obtain the cache line (426). When the requested cache line is returned, the write data is merged with the cache line data and stored to the cache memory (418).

Figure 4:
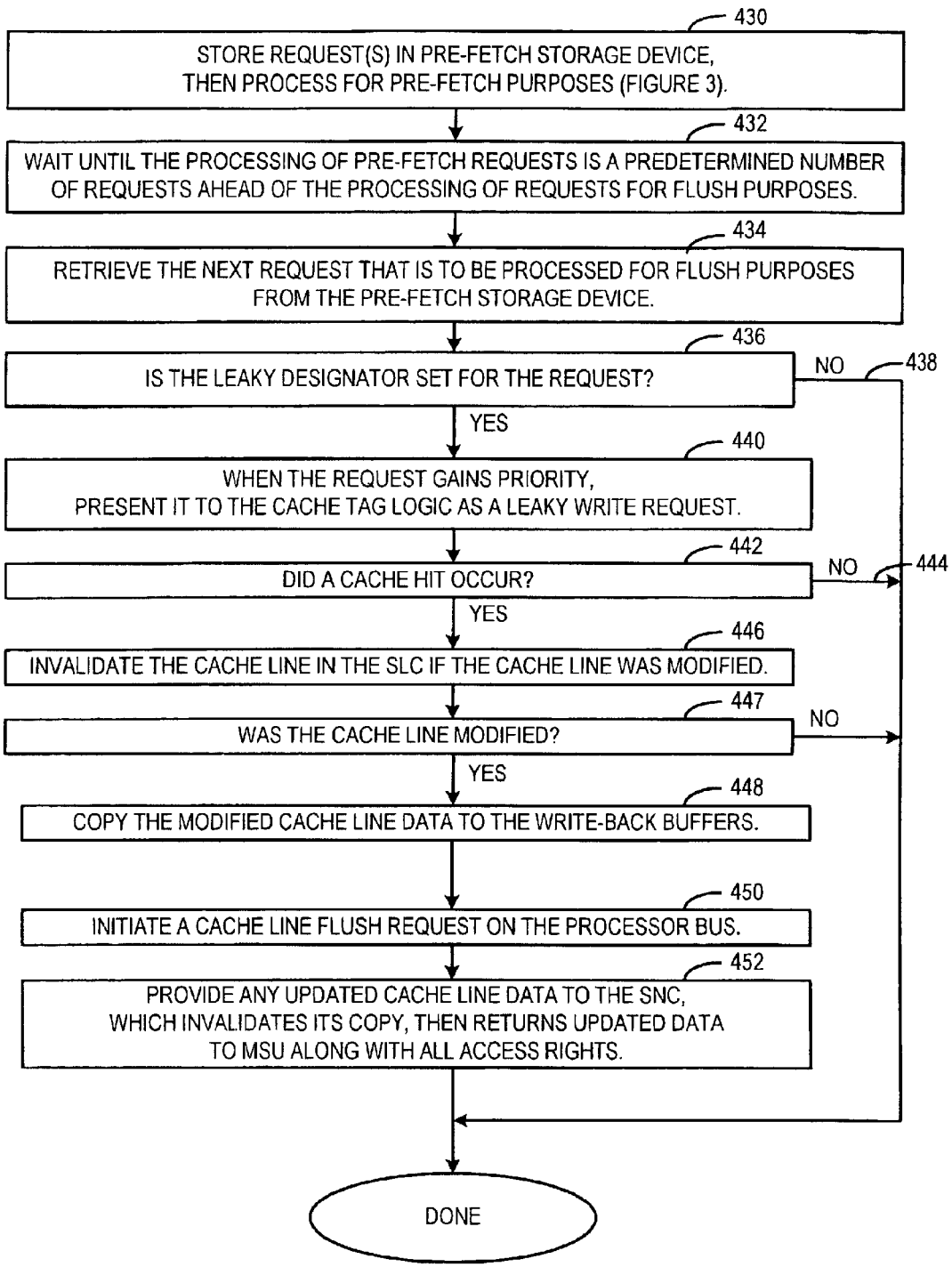
FIG. 4 is a flow diagram illustrating one method of processing flush requests according to the current invention.

FIG. 4 is a flow diagram illustrating one method of processing flush requests according to the current invention.

One or more requests are stored in the pre-fetch storage device shown as GRA 300 in FIG. 2. These requests are processed as pre-fetch requests by pre-fetch control logic 304 (430). In one embodiment, the processing of requests proceeds as shown in FIG. 3. When the processing of pre-fetch requests is a predetermined number of requests ahead of the processing of requests for flush purposes (432), the next request scheduled for flush processing may be retrieved from the pre-fetch storage device (434). As discussed above, this throttling of requests may be performed by programming leaky write control logic 320 such that flush pointer 322 lags GRA pointer 308 by a predetermined number of requests.

After a request is retrieved for flush processing, it is determined whether the leaky designator is activated (436). If not, the flush processing is completed, as shown by arrow 438. Otherwise, when the request gains priority, it will be provided to tag logic 212 as a flush request (440). If a cache miss occurs (442, 444), the cache line has already been flushed. This may occur because of a request that was snooped from processor bus 104A. Otherwise, the cache line is invalidated (446). Recall that in one embodiment, invalidation only occurs if the cache line has been modified.

If the cache line was not modified (447), processing is considered complete. Otherwise, the modified data is copied to background write-back buffers 233 (448), and a flush cache line request is initiated on the processor bus (450). The flush cache line request is snooped by all SLCs 108 and SNC 102A on processor bus 104A. When SLC 108A snoops its own request from processor bus 104A, BC 114A provides the updated cache line data from write-back buffers 233 to processor bus 104A, and causes IP 110A to invalidate any valid copy stored in FLC 203.

When SNC 102A receives the flushed data, any retained copy stored within TLC 106A (452) is invalidated. SNC 102A forwards any modified data from SLC 108A to MSU 100. Otherwise, if SLC 108A did not return any modified data, and SNC 102A retains the latest copy of the data, that copy data is provided to MSU 100 instead. If the cache line was not updated, only access rights are returned to MSU 100. MSU 100 then updates directory 101 to reflect the fact that the MSU owns the cache line. Processing is thereafter considered completed.

It will be appreciated that many alternative embodiments of the foregoing system and method are possible within the scope of the current invention. Thus, the above described embodiments are to be considered exemplary only, with the scope ion is therefore indicated only by the claims that follow, rather than by description.

What is claimed is:

1. For use in a data processing system having a memory and a cache, a system to selectively flush data from the cache, comprising:
   a storage device to store multiple request addresses
   a pre-fetch control circuit coupled to the storage device to determine which of the multiple request addresses will be used to initiate retrieval of data from the cache, and if the data is determined not to be resident within the cache, to initiate the retrieval of the data from the memory; and
   a programmable leaky write control circuit coupled to the storage device to initiate the flushing of the data from the cache.

2. The system of claim 1, wherein the leaky write control circuit includes a circuit to determine which of the multiple request addresses will be used to initiate flushing of data from the cache.

3. The system of claim 2, wherein the leaky write control circuit includes a circuit to control initiating the flushing of data only when a request address that will be used to initiate a next retrieval of the data is stored in one of the storage locations having a predetermined relationship to a second one of the storage locations storing a second request address that will be used to initiate a next flushing of data from the cache.

4. The system of claim 2, wherein the leaky write control circuit includes a circuit to control initiating the flushing of data only when a request address that will be used to initiate a next retrieval of the data was provided to the storage device a programmable number of request addresses before a second request address that will be used to initiate a next flushing of data from the cache.

5. The system of claim 1, and further including programming logic coupled to program the leaky write control circuit.

6. The system of claim 1, wherein the storage device includes circuits to store a leaky designator for the request address.

7. The system of claim 6, wherein the leaky write control circuit includes a circuit to initiate the flushing from the cache of data addressed by the request address only if the leaky designator is activated.

8. The system of claim 7, wherein the storage device includes circuits to store multiple request addresses, each including a respective leaky designator, and wherein the leaky write control circuit initiates the flushing from the cache of data addressed by each of the request addresses for which the respective leaky designator is activated.

9. The system of claim 8, wherein the leaky write control circuit includes a filter to prevent predetermined request addresses from being stored within the storage device.

10. The system of claim 9, wherein the filter includes a circuit to prevent a request address from being stored within the storage device if the request address has a predetermined relationship to a request address that is already stored within the storage device.

11. The system of claim 9, wherein the filter includes a circuit to prevent a request address from being stored within the storage device if the request address is the same as a request address that is already stored within the storage device.

12. The system of claim 9, wherein the filter includes a circuit to prevent a request address from being stored within the storage device if the request address is the same as the request address that was most recently stored within the storage device.

13. The system of claim 12, wherein the filter includes a timer, and the circuit prevents the request address from being stored within the storage device only if the request address most recently stored within the storage device was stored within a predetermined time period measured by the timer.

14. The system of claim 9, and further including programming logic coupled to programmably control the filter.

15. For use in a data processing system having a cache, a system to selectively flush data from the cache, comprising:
 a storage device to store a request address;
 a programmable leaky write control circuit coupled to the storage device to initiate the flushing from the cache of data addressed by the request address;
 an IP;
 a primary interface coupling the IP to the cache; and
 an auxiliary interface coupling the IP to the storage device to provide the request address from the IP to the storage device.

16. The system of claim 15, and further including interface control logic coupled to the primary interface to provide a request from the IP to the cache simultaneously with the request address being provided via the auxiliary interface.

17. The system of claim 15, wherein the IP includes decode logic to decode instructions, and to provide, for each of predetermined ones of the instructions, a respective request address to the storage device via the auxiliary interface.

18. The system of claim 15, wherein the interface control logic includes a circuit to provide a request from the IP to cache to access data that was pre-fetched by the pre-fetch control circuit.

19. The system of claim 18, and further including priority logic coupled to the cache to grant the request provided over the primary interface a predetermined priority level as compared to the request address provided over the auxiliary interface.

20. A method of flushing data from a cache memory to at least one other memory, comprising:
 a.) pre-fetching data signals from one of the other memories, then referencing the data signals within the cache memory; and
 b.) flushing the data signals from the cache memory after a predetermined delay has occurred, wherein the predetermined delay is determined based on pre-fetching step a.).

21. The method of claim 20, wherein step b.) includes flushing the data signals to a predetermined one of the at least one other memory.

22. The method of claim 21, and further including:
 providing one or more requests, each to pre-fetch respective ones of the data signals;
 determining, for each of the one or more requests, whether the respective ones of the data signals are stored in the cache memory;
 pre-fetching the respective ones of the data signals that are not stored within the cache memory; and
 storing the respective ones of the data signals to the cache memory.

23. The method of claim 22, wherein each of the one or more requests includes a respective leaky designator, and wherein, for each request, the respective data signals are flushed only if the respective leaky designator is activated.

24. The method of claim 23, wherein the respective data signals for a request are flushed a programmable time period after flushing respective data signals for a previous request.

25. The method of claim 23, wherein each of the one or more requests is flushed at a time that is based on which of the one or more requests is being processed in the determining step.

26. The method of claim 25, wherein a first request is flushed when another request that was provided a predetermined number of requests after the first request is being processed in the determining step.

27. The method of claim 26, wherein the predetermined number of requests is programmable.

28. The method of claim 23, including temporarily storing the requests in a storage device.

29. The method of claim 23, wherein a first request that is stored within a first storage location within the storage device, and wherein the first request is flushed when the determining step is performed on a request stored within a second storage location within the storage device that has a programmable relationship to the first storage location.

30. The method of claim 29, wherein the requests are stored within the storage device in a time order, and wherein the first and second storage locations are separated by a programmable number of other storage locations within the storage device.

31. The method of claim 28, and further including storing only requests that do not have a predetermined relationship to requests already stored within the storage device.

32. The method of claim 31, wherein each of the requests includes a respective address, and further including storing only requests for which the respective address does not have a predetermined relationship to a respective address for a request already stored within the storage device.

33. The method of claim 32, wherein the predetermined relationship is "equal to".

34. The method of claim 33, and further including storing a request in the storage device only if the respective address is equal to a respective address of the request most recently stored within the storage device.

35. The method of claim 34, and further including storing a request in the storage device only if the respective address is equal to a respective address of the request most recently stored within the storage device, and the request most recently stored within the storage device was stored within a predetermined period of time.

36. The method of claim 22, and further including updating one or more of the data signals stored within the cache.

37. The method of claim 36, including updating one or more of the respective data signals before storing the one or more of the respective data signals to the cache memory.

38. The method of claim 22, wherein an IP is coupled to the cache memory over a primary interface and an auxiliary interface; wherein the providing of the one or more requests to pre-fetch respective ones of the data signals is performed via the auxiliary interface, and further including providing a request over the primary interface to access the data signals stored within the cache memory.

39. The method of claim 38, wherein providing a request to pre-fetch respective ones of the data signals may be performed via the auxiliary interface substantially simultaneously with providing a request over the primary interface to access the data signals.

40. For use in a data processing system including an instruction processor (IP) coupled to a cache memory, a method of managing the cache memory, comprising:
  a.) providing a pre-fetch request from the IP to the cache memory;
  b.) determining whether data identified by the pre-fetch request is stored within the cache memory;
  c.) pre-fetching the data if the data is not stored within the cache memory; and
  d.) flushing the data from the cache memory at a time determined by a programmable control value and further determined based on the pre-fetching of the data.

41. The method of claim 40, and further including providing a request from the IP to the cache memory to access the data.

42. The method of claim 41, wherein the request includes data to be written to the cache memory.

43. The method of claim 42, wherein the IP is coupled to the cache memory via a primary interface, and wherein the request to access the data is provided over the primary interface.

44. The method of claim 43, wherein the IP is coupled to the cache memory via an auxiliary interface, and wherein step a.) is performed over the auxiliary interface.

45. The method of claim 40, and further including:
  decoding an instruction by the IP; and
  performing steps a.) through d.) if the instruction is a predetermined type of instruction.

46. The method of claim 40, wherein the data processing system includes a second memory coupled to the cache memory, and further including performing steps a.) through d.) if a copy of the data is stored within a portion of the second memory designated as "leaky".

47. The method of claim 41, and further including performing steps a.) through d.) if the request to access the data was generated as a result of the IP executing a software process designated to be "leaky".

48. For use in data processing system having a first memory coupled to a second memory, a system to transfer data from the first memory to the second memory, comprising:
  a storage device to store an address identifying associated data signals;
  pre-fetch control logic coupled to the storage device to initiate a pre-fetch operation for the address whereby the data signals are pre-fetched if the data signals are not stored within the first memory; and
  leaky write control logic coupled to the storage device to initiate the transfer of the data signals from the first memory to the second memory at a time controlled by a programmable value and based on the rate at which pre-fetch operations are initiated to the first memory.

49. The system of claim 48, wherein the leaky write control logic includes a timer that controls the time based on the programmable value.

50. The system of claim 48, and further including cache control logic coupled to the first memory to control storing pre-fetched data signals to the first memory.

51. The system of claim 48, wherein the storage device stores multiple addresses, each identifying associated data signals.

52. The system of claim 51, wherein the storage device includes multiple storage locations, wherein a first address is stored within a first storage location, wherein a second address is stored within a second storage location that has a programmable relationship to the first storage location, and wherein the leaky write control logic includes circuits to control the time of initiating the transfer of data signals associated with the second address based on when the pre-fetch control logic initiates a pre-fetch operation for the first address.

53. The system of claim 51, wherein the multiple addresses are stored into the storage device in time order of receipt, and wherein the leaky write control logic includes circuits to initiate the transfer of data signals associated with an address after a programmable number N additional addresses received after the address have been stored in the storage device, and after pre-fetch control logic initiates a pre-fetch operation for the Nth additional address.

54. A system for flushing data from a cache memory, comprising:
  means for pre-fetching data signals for the cache memory; and
  means for flushing the data signals from the cache memory after a predetermined delay has occurred, wherein the delay is based on a rate at which the data signals are pre-fetched.

55. The system of claim 54, wherein the means for flushing includes means for controlling the delay based on which of the data signals are being pre-fetched by the means for pre-fetching.

* * * * *